United States Patent
Ali et al.

(10) Patent No.: US 10,977,113 B2
(45) Date of Patent: Apr. 13, 2021

(54) SYSTEM AND METHOD FOR FAULT IDENTIFICATION, LOGGING, AND REMEDIATION

(71) Applicant: Dell Products L.P., Hopkinton, MA (US)

(72) Inventors: Rizwan Ali, Cedar Park, TX (US); Dharmesh M. Patel, Round Rock, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 150 days.

(21) Appl. No.: 16/261,204

(22) Filed: Jan. 29, 2019

(65) Prior Publication Data

US 2020/0241953 A1 Jul. 30, 2020

(51) Int. Cl.
G06F 11/07 (2006.01)

(52) U.S. Cl.
CPC ...... *G06F 11/0793* (2013.01); *G06F 11/0748* (2013.01)

(58) Field of Classification Search
CPC ............... G06F 11/766; G06F 11/0775; G06F 11/0778; G06F 11/0781; G06F 11/079; G06F 11/0793; G06F 11/2257; G06F 11/2263; G06F 11/2268; G06F 11/2294; H04L 41/0604; H04L 41/0631; H04L 41/0645; H04L 41/065; H04L 41/0654; H04L 41/0686; H04L 41/16; H04M 3/247
See application file for complete search history.

(56) References Cited

U.S. PATENT DOCUMENTS

| 5,463,768 | A | * | 10/1995 | Cuddihy | G06F 11/2205 714/37 |
| 5,528,516 | A | * | 6/1996 | Yemini | G06F 11/2257 702/181 |
| 5,666,481 | A | * | 9/1997 | Lewis | G06F 11/2257 714/4.2 |
| 5,740,354 | A | * | 4/1998 | Ben-Natan | G06F 11/0718 714/45 |
| 6,076,083 | A | * | 6/2000 | Baker | H04L 69/40 706/52 |
| 6,336,065 | B1 | * | 1/2002 | Gibson | B61C 17/12 701/31.4 |
| 6,622,264 | B1 | * | 9/2003 | Bliley | G06F 11/2257 714/26 |
| 6,651,183 | B1 | * | 11/2003 | Gensler, Jr. | G06F 11/0709 714/4.3 |
| 7,222,127 | B1 | | 5/2007 | Bem et al. | |

(Continued)

*Primary Examiner* — Gabriel Chu

(74) *Attorney, Agent, or Firm* — Chamberlain, Hrdlicka, White, Williams & Aughtry

(57) ABSTRACT

A client recovery orchestrator for recovering clients after faults includes a persistent storage and a recovery manager. The persistent storage stores a fault correction script. The recovery manager obtains a fault profile associated with a client of the clients, matches the fault profile to a corrective action based on an associative model that associates dimensions of the fault profile and the corrective action, obtains the fault correction script based on the corrective action, orchestrates execution of the fault correction script to obtain an updated client, and updates the associative model based on the updated client.

20 Claims, 14 Drawing Sheets

(56) References Cited

U.S. PATENT DOCUMENTS

| | | | |
|---|---|---|---|
| 7,516,362 B2 | 4/2009 | Connelly et al. | |
| 8,401,982 B1 | 3/2013 | Satish et al. | |
| 9,313,091 B1* | 4/2016 | Schnegelberger | H04L 41/0631 |
| 9,501,345 B1* | 11/2016 | Lietz | G06F 16/00 |
| 2007/0266138 A1* | 11/2007 | Spire | H04L 63/1416 |
| | | | 709/223 |
| 2009/0106589 A1* | 4/2009 | Ramacher | G06F 11/0778 |
| | | | 714/25 |
| 2011/0231704 A1* | 9/2011 | Ge | G06F 11/0709 |
| | | | 714/26 |
| 2013/0166967 A1* | 6/2013 | Jerde | G06F 11/0748 |
| | | | 714/48 |
| 2013/0185592 A1* | 7/2013 | Fleming | G06F 11/079 |
| | | | 714/37 |
| 2014/0006871 A1* | 1/2014 | Lakshmanan | H04L 41/064 |
| | | | 714/37 |
| 2015/0089309 A1* | 3/2015 | Fu | G06F 11/0724 |
| | | | 714/57 |
| 2018/0239694 A1* | 8/2018 | Nallabothula | G06F 11/2294 |
| 2019/0354457 A1* | 11/2019 | Urmanov | H04L 63/1425 |

* cited by examiner

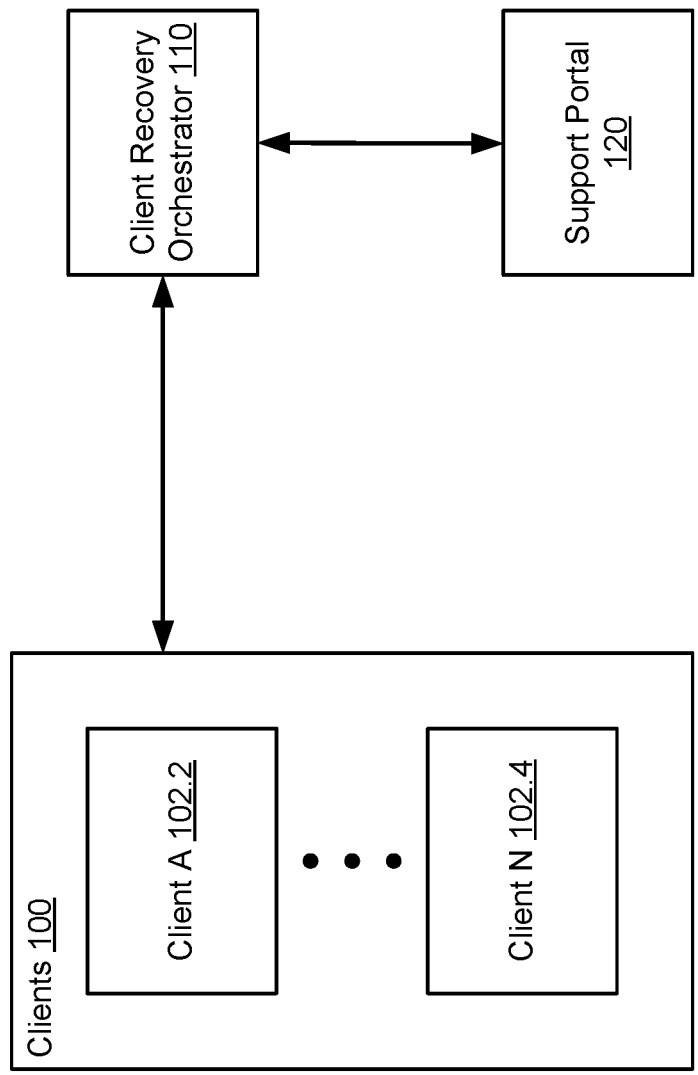
FIG. 1.1

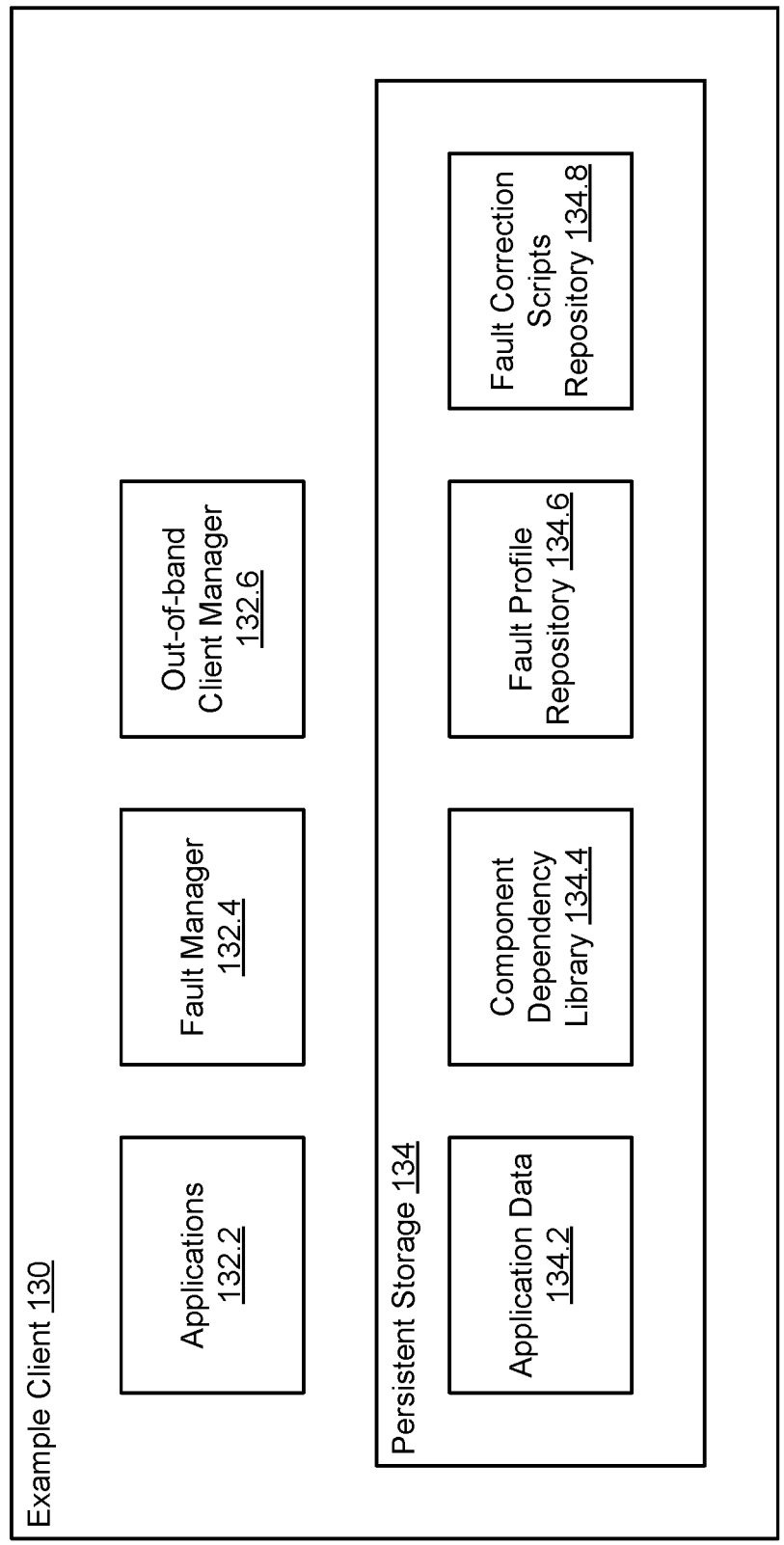
FIG. 1.2

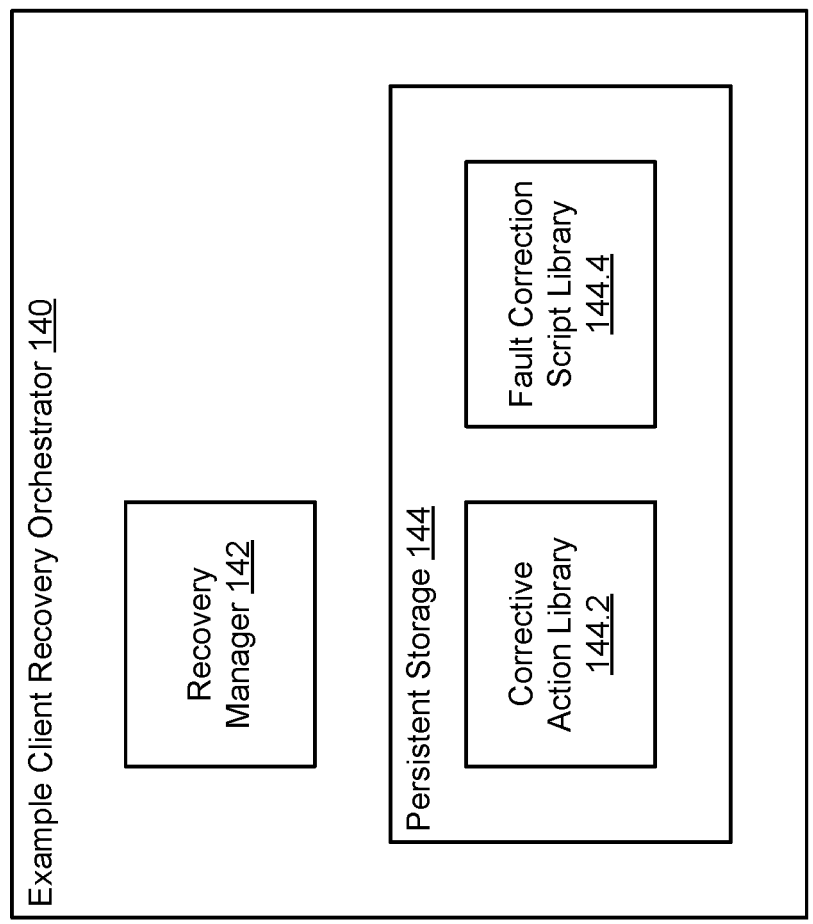

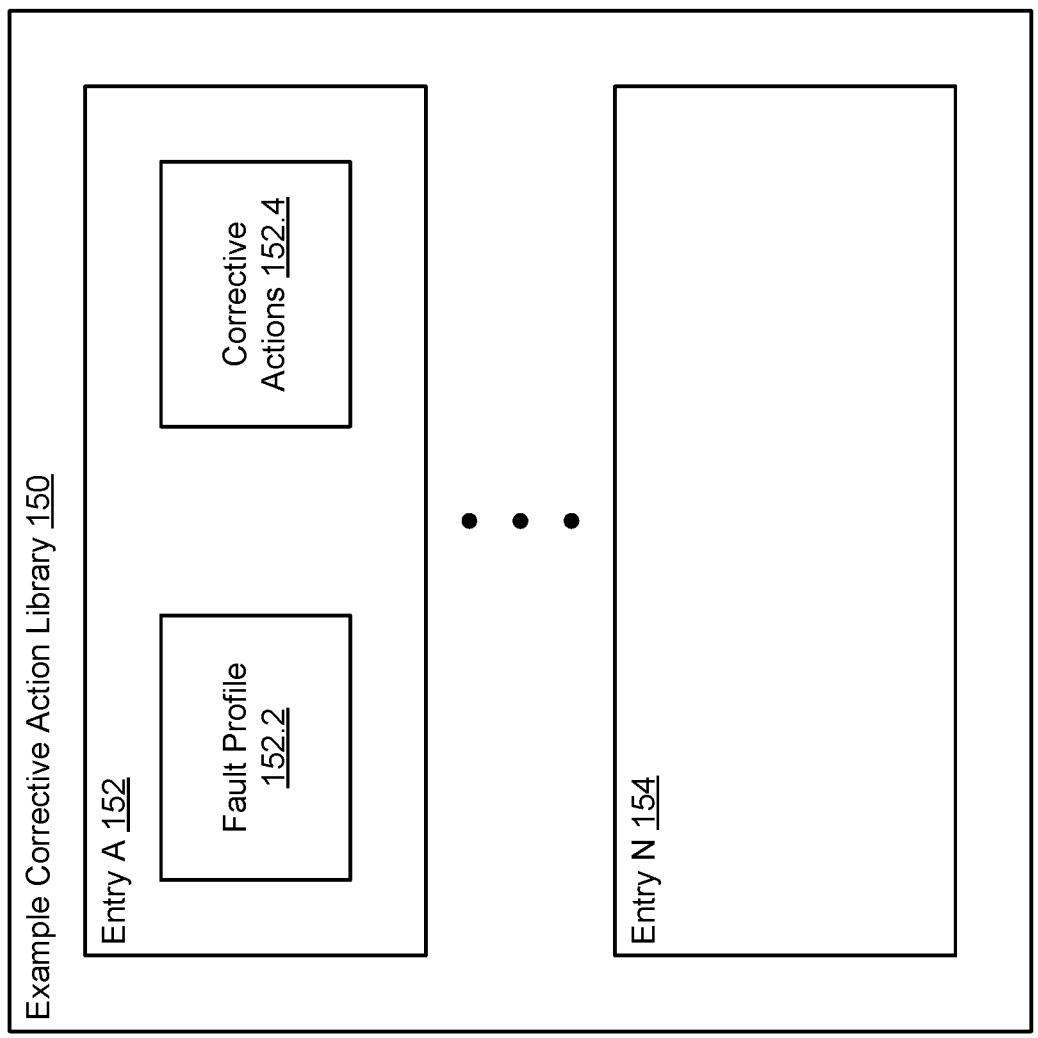

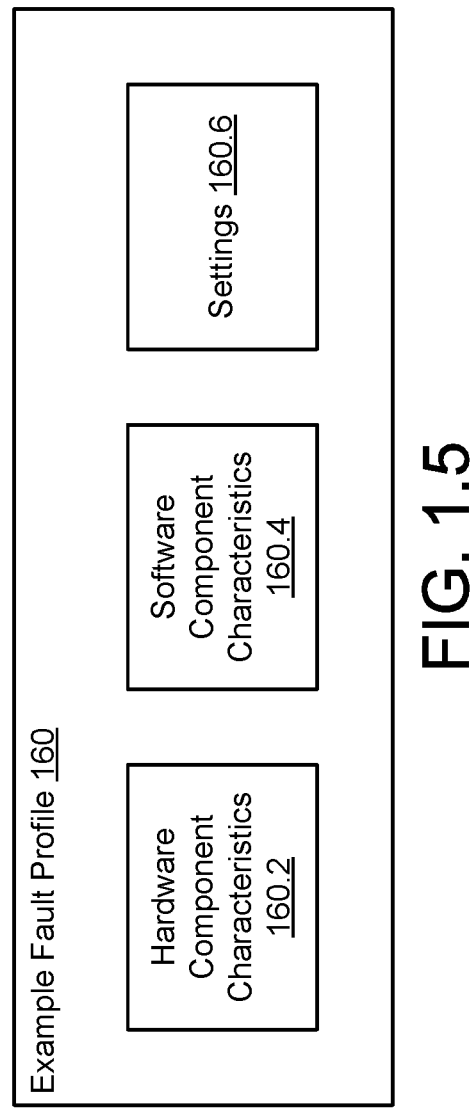

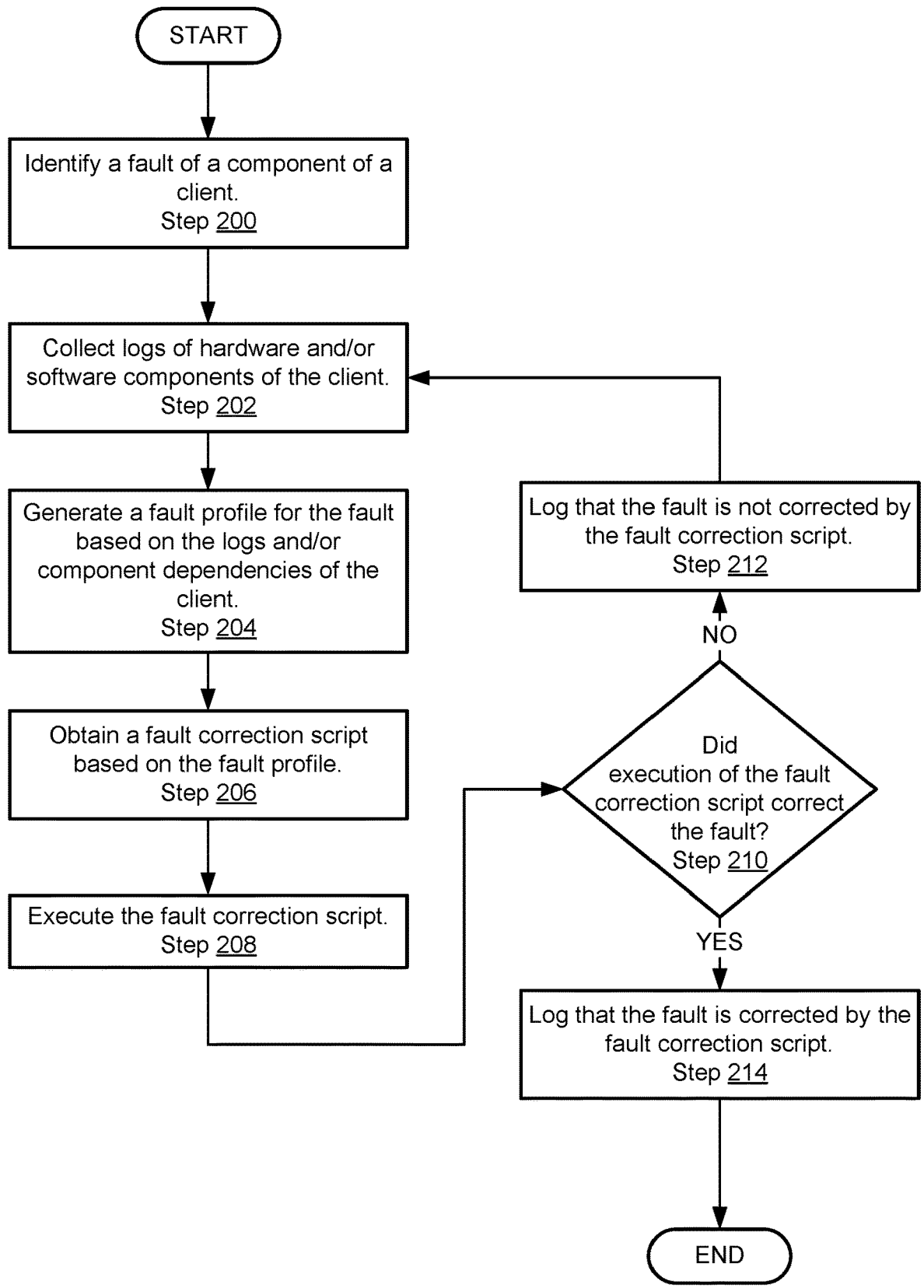
FIG. 2.1

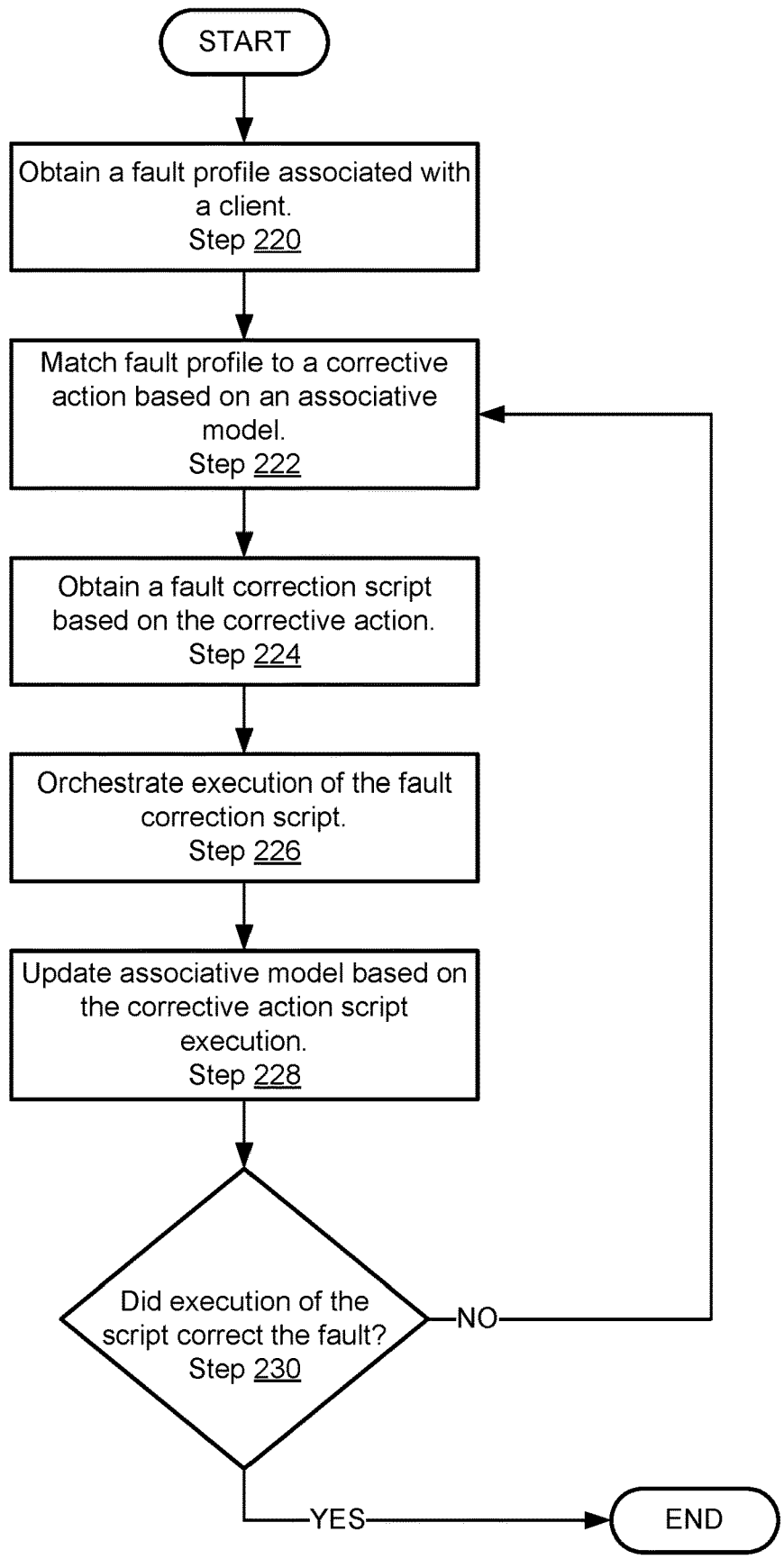
FIG. 2.2

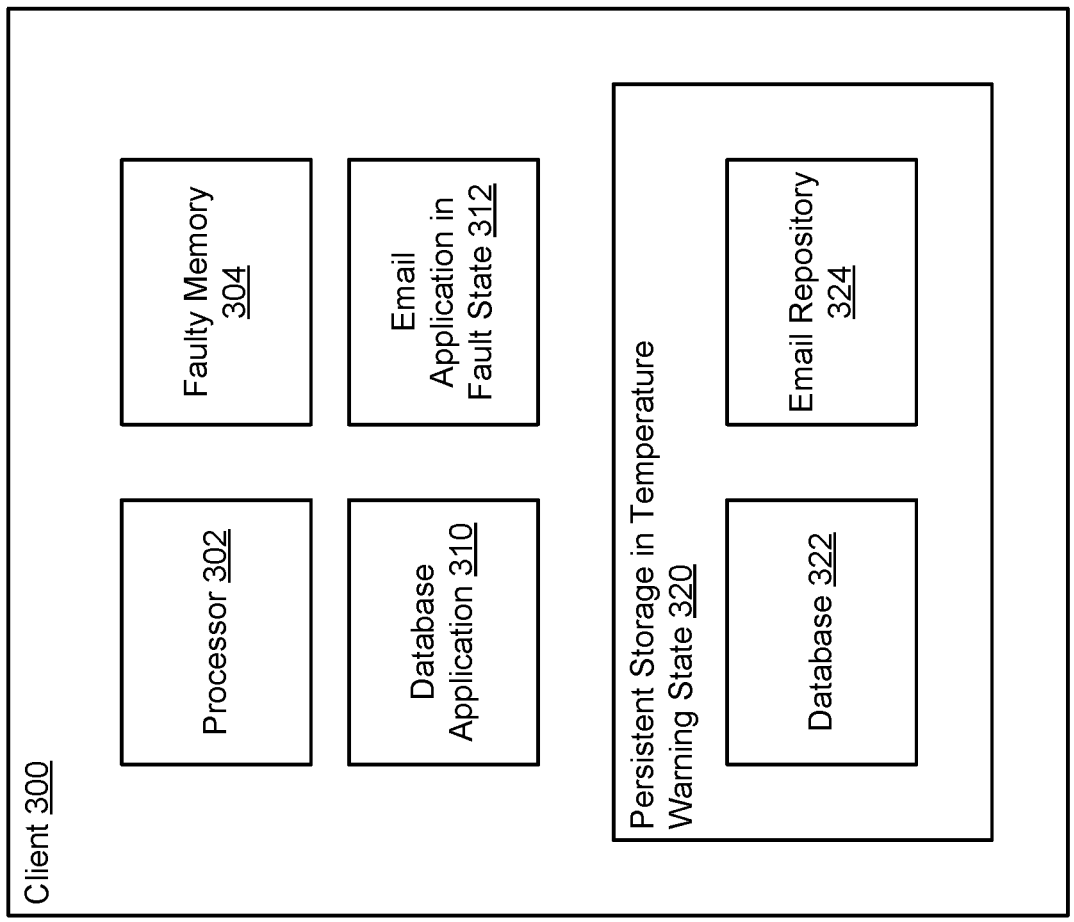
FIG. 3.1

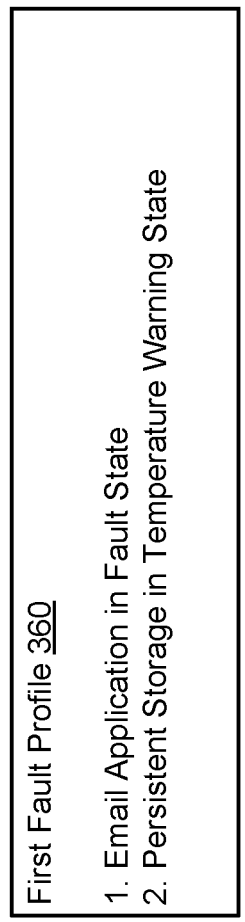
FIG. 3.2

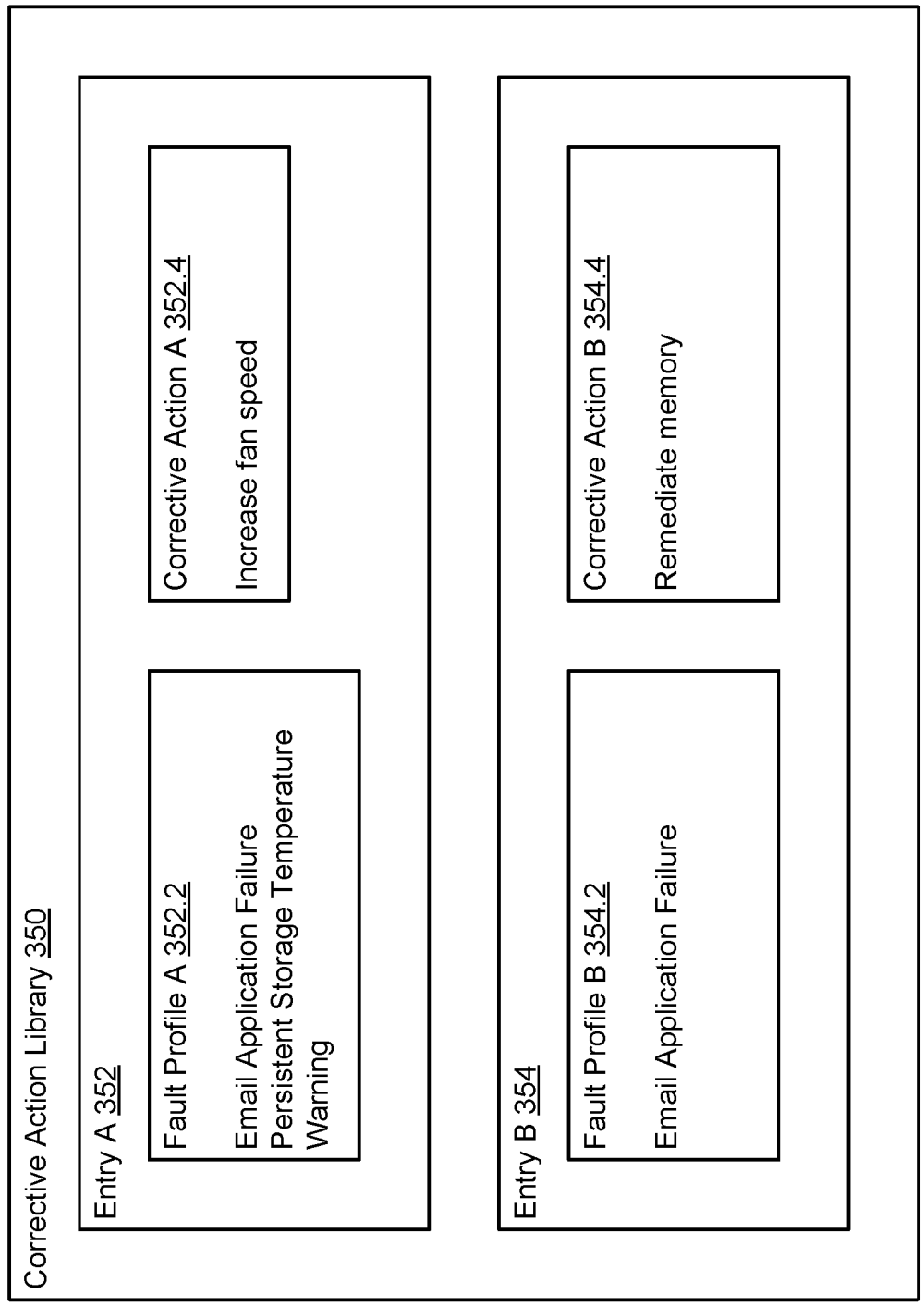
FIG. 3.3

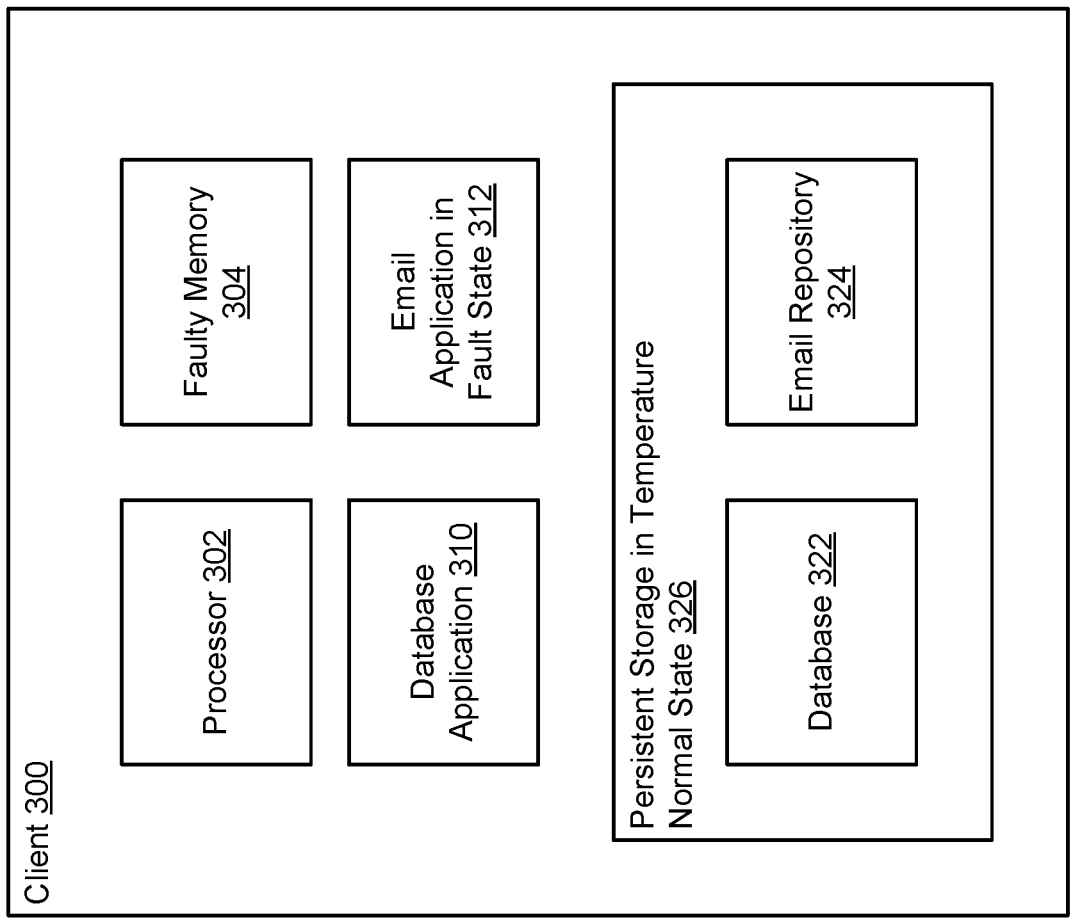
FIG. 3.4

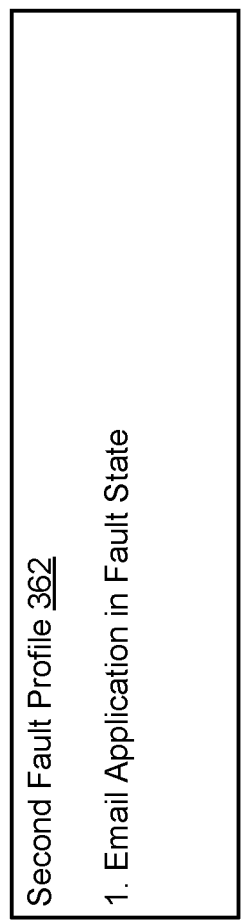
FIG. 3.5

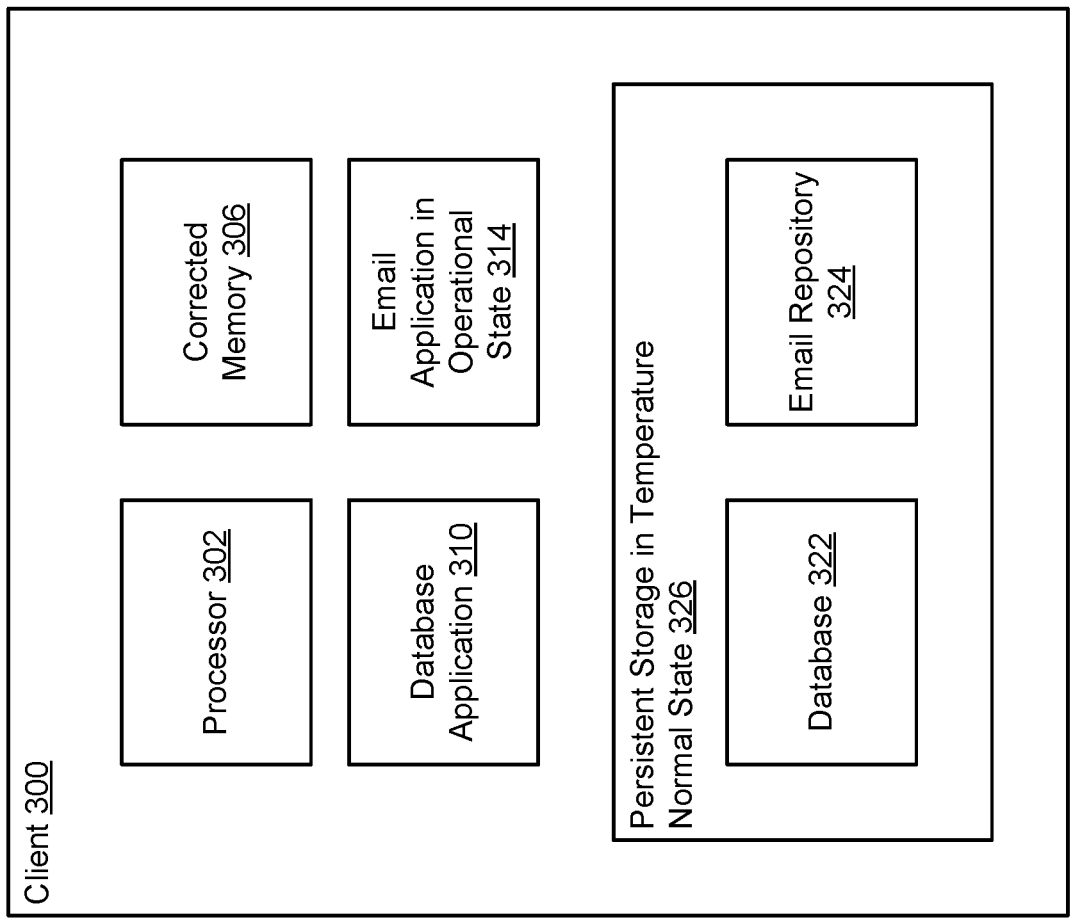
FIG. 3.6

SYSTEM AND METHOD FOR FAULT IDENTIFICATION, LOGGING, AND REMEDIATION

BACKGROUND

Computing devices may provide computer implemented services. Providing such services may utilize computing resources of the computing device. If a component of a computing device is in a fault state, the computing device may not be able to provide the computer implemented services.

SUMMARY

In one aspect, a client recovery orchestrator for recovering clients after faults in accordance with one or more embodiments of the invention includes a persistent storage and a recovery manager. The persistent storage stores a fault correction script. The recovery manager obtains a fault profile associated with a client of the clients, matches the fault profile to a corrective action based on an associative model that associates dimensions of the fault profile and the corrective action, obtains the fault correction script based on the corrective action, orchestrates execution of the fault correction script to obtain an updated client, and updates the associative model based on the updated client.

In one aspect, a method for recovering clients after faults in accordance with one or more embodiments of the invention includes obtaining a fault profile associated with a client of the clients; matching the fault profile to a corrective action based on an associative model that associates dimensions of the fault profile and the corrective action; obtaining a fault correction script based on the corrective action; executing the fault correction script to obtain an updated client; and updating the associative model based on the updated client.

In one aspect, a non-transitory computer readable medium in accordance with one or more embodiments of the invention includes computer readable program code, which when executed by a computer processor enables the computer processor to perform a method for recovering clients after faults. The method includes obtaining a fault profile associated with a client of the clients; matching the fault profile to a corrective action based on an associated model that associates dimensions of the fault profile and the corrective action; obtaining a fault correction script based on the corrective action; executing the fault correction script to obtain an updated client; and updating the associative model based on the updated client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example client in accordance with one or more embodiments of the invention.

FIG. 1.3 shows a diagram of an example fault correction orchestrator in accordance with one or more embodiments of the invention.

FIG. 1.4 shows a diagram of an example corrective action library in accordance with one or more embodiments of the invention.

FIG. 1.5 shows a diagram of an example fault profile in accordance with one or more embodiments of the invention.

FIG. 2.1 shows a diagram of a flowchart of a method for correcting a fault in accordance with one or more embodiments of the invention.

FIG. 2.2 shows a diagram of a flowchart of a second method for correcting a fault in accordance with one or more embodiments of the invention.

FIG. 3.1 shows a diagram of an example of a client at a first point in time.

FIG. 3.2 shows a diagram of a first fault profile associated with the client of FIG. 3.1.

FIG. 3.3 shows a diagram of a corrective action library of a fault correction orchestrator providing fault correction services to the client of FIG. 3.1

FIG. 3.4 shows a diagram of the client of FIG. 3.1 at a second point in time.

FIG. 3.5 shows a diagram of a second fault profile associated with the client of FIG. 3.4.

FIG. 3.6 shows a diagram of the client of FIG. 3.4 at a third point in time.

DETAILED DESCRIPTION

Figure 4:
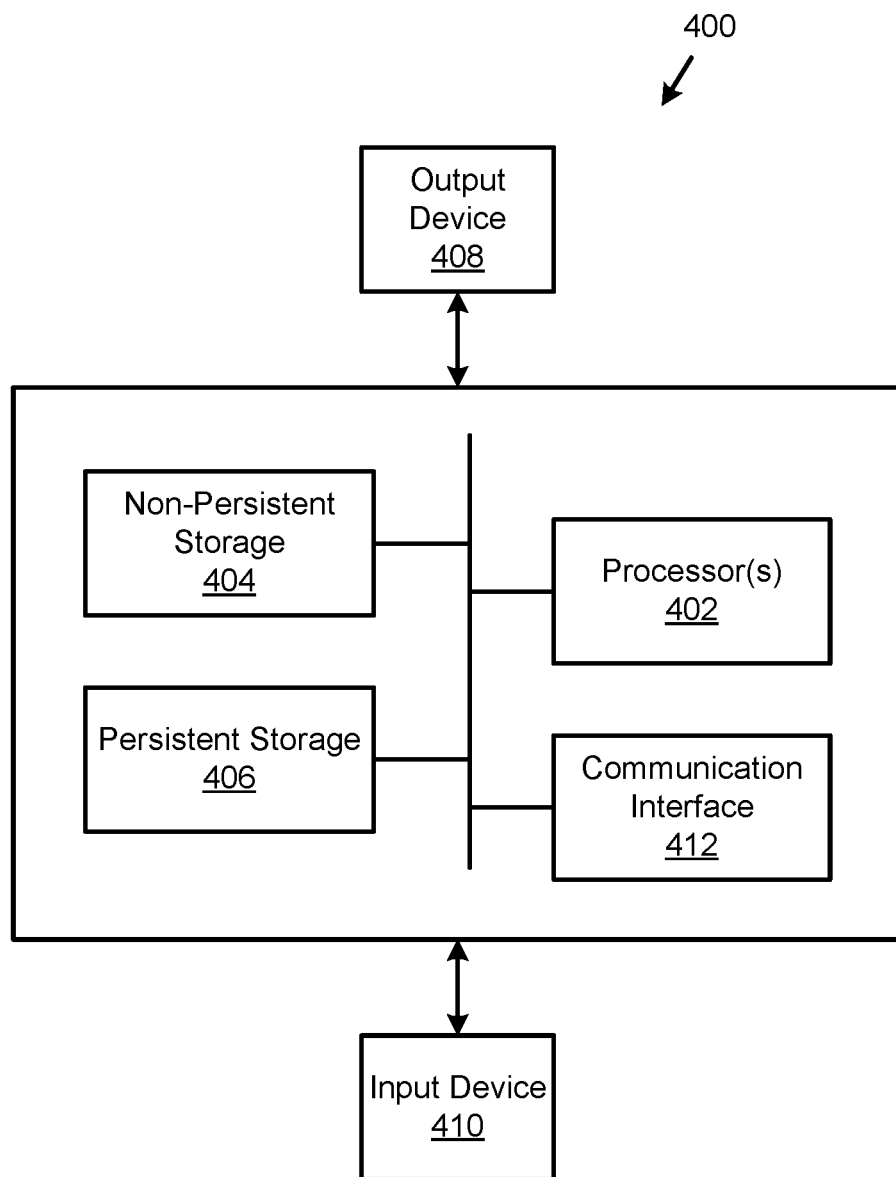
FIG. 4 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing faults of computing devices. Fault of a computing device may prevent a computing device from providing computer implemented services offered by the computing device.

In one or more embodiments of the invention, the system may manage faults by correcting the faults. Embodiments of the invention correct faults by matching a fault profile of a computing device having a fault to one or more corrective actions. A fault correction script data structure usable for instructing the client or other entity on how to correct the fault may be generated based on the corrective actions.

In one or more embodiments of the invention, the system may identify faults and generate the full profiles based on dependencies between different components of a computing device. By doing so, fault profile including rich log information may be generated and used as the basis for corrective action selection.

FIG. 1.1 shows a diagram of a system in accordance with one or more embodiments of the invention. The system may facilitate recovery of clients (100) after a fault of one or more components of the clients (100).

To facilitate recovery of the clients (100), the system may include a client recovery orchestrator (110) and support portal (120). The client recovery orchestrator (110) may attempt to identify a cause of the faults and attempt to remediate the faults. If a fault cannot be remediated, the client recovery orchestrator (110) may notify administrators or other personnel via the support portal (120).

Any of the components of FIG. 1.1 may be operably connected by any combination of wired and/or wireless networks. For example, the clients (100) may be operably connected to the client recovery orchestrator (110) and/or other entities (not shown) by a network (not shown). While for the sake of brevity the system of FIG. 1.1 has been illustrated as including a limited number of components, embodiments of the invention may include additional components than those shown in FIG. 1.1 without departing from the invention. Each component of the system of FIG. 1.1 is described below.

The clients (100) may provide computer implemented services to users. For example, the clients (100) may host any number of applications that each provides computer implemented services to users of the clients and/or other devices. The system may include any number of clients (102.2, 102.4) that provide similar and/or different computer implemented services to any number of users and/or other entities, e.g., other devices.

In one or more embodiments of the invention, a portion of the clients (100) are part of a solution architecture. A solution architecture may be a distributed system that provides predetermined functionality. Each of the clients of the portion of the clients (100) may cooperatively provide the predetermined functionality of the solution architecture.

In one or more embodiments of the invention, the clients (100) provide information regarding faults that have occurred to the client recovery orchestrator (110). After a fault occurs (or is otherwise detected), the clients (100) may perform actions under the direction of the client recovery orchestrator (110) to resolve or otherwise remediate the faults.

In one or more embodiments of the invention, a fault is a change in state of a component of a client from a predetermined state. For example, a failure of a processor of a client may be a fault. In another example, a failure of an application hosted by a client may be a fault. In a still further example, a decrease in performance of an application may be a fault. In yet another example, a change in functionality of a component of a client may be a fault. Faults may be other types of state changes of components of the clients without departing from the invention.

In one or more embodiments of the invention, each of the clients (102.2, 102.4) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 4. The persistent storage may store computer instructions, e.g., computer code, that when executed by the processor(s) of the computing device cause the computing device to perform the functions of the clients (102.2, 102.4) described in this application and/or all, or a portion, of the methods illustrated in FIGS. 2.1-2.2. The clients (102.2, 102.4) may be other types of computing devices without departing from the invention.

While the clients (102.2, 102.4) have been described as being physical devices, the clients (102.2, 102.4) may be implemented as logical devices, e.g., virtual devices, which utilize computing resources of other physical computing devices without departing from the invention. For example, the clients (102.2, 102.4) may be implemented as logical devices that utilize computing resources of computing devices or other entities operably connected to the node. For additional details regarding clients, refer to FIG. 1.2.

The client recovery orchestrator (110) may provide recovery services to the clients (100). Providing recovery services may remediate faults of the clients. Providing recovery services may include: (i) obtaining state information from the clients after a fault has occurred, (ii) attempting to remediate the fault, and (iii) refining the ability of the client recovery orchestrator (110) to remediate faults based on previous attempts to remediate faults. By doing so, client faults may be corrected or otherwise mitigated.

In one or more embodiments of the invention, the client recovery orchestrator (110) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 4. The persistent storage may store computer instructions, e.g., computer code, that when executed by the processor(s) of the computing device cause the computing device to perform the functions of the client recovery orchestrator (110) described in this application and/or all, or a portion, of the methods illustrated in FIGS. 2.1-2.2. The client recovery orchestrator (110) may be other types of computing devices without departing from the invention.

While the client recovery orchestrator (110) has been described as being a physical device, the client recovery orchestrator (110) may be implemented as a logical device, e.g., virtual device, which utilize computing resources of other physical computing devices without departing from the invention. For example, the client recovery orchestrator (110) may be implemented as logical device that utilizes computing resources of computing devices or other entities operably connected to the client recovery orchestrator (110). For additional details regarding the client recovery orchestrator (110), refer to FIG. 1.3.

The support portal (120) may provide fault analysis services to the client recovery orchestrator (110). Providing fault analysis services may identify new ways of correcting client faults that were previously unknown to the client recovery orchestrator (110). Providing fault analysis services may include: (i) obtaining state information from the clients after an unresolvable fault has occurred, (ii) assigning administrator or other personnel to review the state information, and (iii) updating corrective actions of the client recovery orchestrator (110)—discussed in greater detail with respect to FIG. 3—based on information obtained from the assigned personnel. By doing so, new options for correcting unrecoverable faults of the clients may be provided to the client recovery orchestrator (110).

In one or more embodiments of the invention, the support portal (120) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 4. The persistent storage may store computer instructions, e.g., computer code, that when executed by the processor(s) of the computing device cause the computing device to perform the functions of the support portal (120) described in this application and/or all, or a portion, of the methods illustrated in FIGS. 2.1-2.2. The support portal (120) may be other types of computing devices without departing from the invention.

While the support portal (120) has been described as being a physical device, the support portal (120) may be implemented as a logical device, e.g., virtual device, which utilize computing resources of other physical computing devices without departing from the invention. For example, the support portal (120) may be implemented as logical device that utilizes computing resources of computing devices or other entities operably connected to the support portal (120).

While the system of FIG. 1.1 has been illustrated as including a limited number of components, a system in accordance with one or more embodiments of the invention may include additional, fewer, and/or different components without departing from the invention. Additionally, while FIG. 1.1 as illustrated as only showing connections between some components of the system, a system in accordance with one or more embodiments of the invention may include any number of connections between any of the components illustrated in FIG. 1.1 and/or other components not illustrated in FIG. 1.1 without departing from the invention.

As noted above, the clients (100) may provide computer implemented services to users. To further clarify the clients (100), a diagram of an example client (130) in accordance with one or more embodiments of the invention is shown in FIG. 1.2.

The example client (100) may include applications (132.2), a fault manager (132.4), and out-of-band client manager (132.6), and persistent storage (134). Each component of the example client (100) is discussed below.

The applications (132.2) may be any type of program executing using computing resources of the example client (130). For example, the applications (132.2) may be electronic mail applications, word processing applications, database applications, electronic messaging applications, and/or any other type of computer implemented service. When executing, the applications (132.2) may generate application data (134.2) that is relevant to a user of the example client (130). Thus, a fault of the example client (130) that limits the ability of users to continue to utilize the services provided by the applications (132.2) may not be desirable.

While described with respect applications that are executing on a single computing device, the applications (132.2) may be other types of applications without departing from the invention. For example, the applications (132.2) may be portions of a distributed system that includes applications executing on multiple computing devices to give rise to the functionality of the distributed application. The applications (132.2) may be part of a cluster environment where the applications (132.2) are executing utilizing virtualized resources of any number of computing devices. Any number of applications (132.2) hosted by any number of physical and/or virtualized resources may collectively and/or individually act to provide services to any number of individual and/or collective entities.

The fault manager (132.4) may manage faults of components of the example client (130). To manage the faults, the fault manager (132.4) may monitor: (i) identify faults based on reports of faults by components of the example client (130), changes in performance of components of the example clients (130), and/or via other methods, (ii) collect logs generated by components of the example client (130) in response to a fault identification, (iii) analyze the logs based on component dependencies, (iv) generate a fault profile based on the analysis of the logs, (v) obtain a fault correction script based on the fault profile, (vi) execute all or a portion of the fault correction script, (vii) determine whether the fault has been remediated by the fault correction script execution, and/or (viii) repeat all or a portion of the preceding actions as necessary to correct the fault. By doing so, embodiments of the invention may provide for the automated remediation of components of clients.

While described with respect to addressing the faults of a single client, a fault manager (132.4) in accordance with embodiments of the invention may manage multiple faults to address a solution architecture problem and/or issues with other clients. For example, the fault manager (132.4) may identify a fault of one client and cause the resulting fault correction script to be executed by any number of clients. The any number of clients may be related such that a fault of one of the clients is likely to be present and/or develop in the future on any number of other of the any number of clients.

In one or more embodiments of the invention, the logs of the components include one or more of the following types of logs: hardware event logs, system logs, network driver logs, solution architecture logs, hypervisor logs, and/or storage host bus adapter logs. The logs of the components may include additional and/or different types of logs without departing from the invention.

In one or more embodiments of the invention, the fault manager (132.4) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the fault manager (132.4) described throughout this application and/or all or a portion of the methods illustrated in FIGS. 2.1-2.2.

In one or more embodiments of the invention, the fault manager (132.4) is implemented as a logical entity. For example, the fault manager (132.4) may be an application executing using hardware resources, e.g., processor cycles, memory capacity, storage capacity, communication bandwidth, etc., of the example client (130).

The out-of-band client manager (132.6) may orchestrate management of faults of components of the example client (130). The out-of-band client manager (132.6) may be a computing device hosted by the example client (130). The out-of-band client manager (132.6) may operate independently of the example client (130). The out-of-band client manager (132.6) may include computing resources, e.g., processors, storage, memory, communicators, separate from those of the example client (130). The out-of-band client manager (132.6) may be operably connected to the example client (130) via an always on connection such as, for example, a bus.

In the event that a fault of the example client (130) renders all or a portion of the example client (130) inoperable, the out-of-band client manager (132.6) may perform the functionality of the fault manager (132.4). Additionally, the out-of-band client manager (132.6) may support a separate network connection, e.g., an out-of-band connection, to other devices. Thus, if the example client (130) is cut off from communicating with other components via its own communications hardware and/or connections, the out-of-band client manager (132.6) may continue to communicate with other devices.

For example, if the example client (130) is cut off from network communications due to a fault, the out-of-band client manager (132.6) may perform the functions of the fault manager (132.4). By doing so, faults that would render the example client (130) inoperable may be corrected even when the example client (130) is in an inoperable state.

In one or more embodiments of the invention, the out-of-band client manager (132.6) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device because the physical device to perform the functions of the out-of-band client manager (132.6) described throughout this application and/or all or a portion of the methods illustrated in FIGS. 2.1-2.2.

The persistent storage (134) may be a physical device for storing digital data. The persistent storage (134) may include any number of physical devices for storing digital data. The physical devices may be, for example, hard disk drives, solid state drives, tape drives, and any other type of physical device for persistent storage of data.

In one or more embodiments of the invention, the persistent storage (134) is a virtualized resource. For example, the persistent storage (134) may be a virtual drive. The virtual drive may use computing resources of any number of physical computing devices without departing from the invention.

The persistent storage (134) may store application data (134.2), a component dependency library (134.4), a fault profile repository (134.6), and/or a fault correction script repository (134.8). Each of these data structures is discussed below.

The application data (134.2) may be a data structure storing data generated by the applications (132.2). Application data (134.2) may include any quantity and type of data.

The component dependency library (134.4) may be a data structure that stores information regarding dependencies between components of the example client (130). A dependency may be a relationship between any number of components of the example client (130). When a component of the example client (130) is in a fault state, the component dependencies specified by the component dependency library (134.4) may be used to identify portions of component logs that may be relevant for addressing the fault. These portions of the logs may be used to generate a fault profile for the fault.

The fault profile repository (134.6) may be a data structure that includes any number fault profiles. A fault profile may include portions of components logs that are relevant for a particular fault. Fault profile may be generated by obtaining all of the component logs from the example client (130) and filtering the logs based on dependencies specified by the component dependency library (134.4).

In one or more embodiments of the invention, the component logs include logs generated by hardware and software components of the example client (130). The component logs may specify characteristics of the state of an associated component of the example client (130). The component logs may specify the characteristics over periods of time and/or at specific points in time.

To generate a fault profile, a component reporting a fault may be used as a key in combination with the component dependency library (134.4) to filter the component logs. For example, the component dependency library (134.4) may specify all of the components of the example client (130) that are associated with a component in a fault state due to dependencies between the faulty component and other components of the example client (130). Only logs of components associated with the faulty component as specified by the component dependency library (134.4) may be included in the fault profile.

The fault profile repository (134.6) may include any number of fault profiles generated at any time. For additional details regarding fault profiles, refer to FIG. 1.5.

The fault correction script repository (134.8) may be a data structure that includes fault correction scripts. Fault correction script may be an executable or descriptive file usable for attempting to correct a fault. For example, if the fault correction script is an executable, the script may be executed to attempt to correct an existing fault. In another example, if the fault correction script is a descriptive file, an interpreter may be used to read the descriptive file and perform actions specified by the descriptive file.

In one or more embodiments of the invention, fault correction scripts of the fault correction scripts repository (134.8) are obtained from a client recovery orchestrator. For example, the example client (130) may send a fault profile to the client recovery orchestrator and the client recovery orchestrator may provide a fault correction script based on the fault profile.

In one or more embodiments of the invention, each of the fault correction scripts is associated with a fault profile. In other words, a fault profile may be attempted to be corrected using the associated fault correction script.

While the example client (130) has been illustrated as including a limited number of component, the example client (130) may include additional, fewer, and/or different components without departing from the invention.

As noted above, the client recovery orchestrator (110, FIG. 1.1) may provide recovery services to the clients (100, FIG. 1.1). To further clarify the client recovery orchestrator (110, FIG. 1.1), a diagram of an example client recovery orchestrator (140) in accordance with one or more embodiments of the invention is shown in FIG. 1.3.

The example client recovery orchestrator (140) may include a recovery manager (142) and persistent storage (144). Each component of the example client recovery orchestrator (140) is discussed below.

The client recovery manager (142) may provide fault recovery services. By providing fault services, clients having faulty components may be remediated. Remediating the clients may eliminate the faults of the faulty components or reduce an impact of a faulty component on the operation of the client.

To provide fault recovery services, the client recovery manager (142) may; (i) obtain a fault profile from a client, (ii) identify one or more corrective actions for remediating the fault, (iii) obtain a fault correction script based on the one or more corrective actions, (iv) orchestrate an attempt to remediate a component fault of the client using the fault correction script, (v) update an associative model between faults and corrective actions based on the outcome of the attempt to remediate the component fault, and/or (vi) notify administrators or other personnel of irremediable faults. The client recovery manager (142) may also orchestrate an attempt to remediate likely future component faults on any number of other clients that are related to the client. Such remediation may be performed in parallel with or after successful remediation of the client. By doing so, embodiments of the invention may automatically remediate client faults.

In one or more embodiments of the invention, the recovery manager (142) identifies the corrective actions using an associative model that relates fault profiles to some of the corrective actions. The corrective actions to be stored in a corrective action library (144.2). The associative model may associate dimensions of the fault profiles with some corrective actions.

In one or more embodiments of the invention, the associative model is generated by a machine learning algorithm. For example, machine learning algorithm may treat different component logs included in the fault profiles as different parameters in the associative model. The machine learning algorithm may generate a relationship between all of the parameters of the fault profile with one or more corrective actions. In this manner, a unique relationship between any number of component logs and a set of corrective actions may be formed.

In one or more embodiments of the invention, the associate model is based on heuristically obtained relationships between fault profiles and corrective actions. For example, as faults are corrected in clients, the associative model may be updated to include a new association between the component logs of the clients in the fault state and the corrective actions that successfully corrected the faults. By doing so, the associative model may be continuously updated as corrective actions are found to remediate component faults.

Each corrective action of the corrective action library (144.2) may be associated with fault correction scripts in a fault correction script library (144.4). To obtain a fault correction script based on the one or more corrective actions, fault correction scripts for each of the one or more corrective actions included in the library may be aggregated to form a single script. For additional details regarding the corrective action library (150), refer to FIG. 1.4.

In one or more embodiments of the invention, the recovery manager (142) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the recovery manager (142) described throughout this application and/or all or a portion of the methods illustrated in FIGS. 2.1-2.2.

In one or more embodiments of the invention, the recovery manager (142) is implemented as a logical entity. For example, the recovery manager (142) may be an application executing using hardware resources, e.g., processor cycles, memory capacity, storage capacity, communication bandwidth, etc., of the example client recovery orchestrator (140).

The persistent storage (144) may be a physical device for storing digital data. The persistent storage (144) may include any number of physical devices for storing digital data. The physical devices may be, for example, hard disk drives, solid state drives, tape drives, and any other type of physical device for persistent storage of data.

In one or more embodiments of the invention, the persistent storage (144) is a virtualized resource. For example, the persistent storage (144) may be a virtual drive. The virtual drive may use computing resources of any number of physical computing devices without departing from the invention.

While the example client recovery orchestrator (140) has been illustrated as including a limited number of component, the example client recovery orchestrator (140) may include additional, fewer, and/or different components without departing from the invention.

To further clarify aspects of embodiments of the invention, diagrams of data structures that may be utilized by components of the system shown in FIG. 1.1 are illustrated in FIGS. 1.4-1.5.

FIG. 1.4 shows a diagram of an example corrective action library (150) in accordance with one or more embodiments of the invention. The example corrective action library (150) may be a data structure that includes information used to identify corrective actions that may be performed to remediate a component fault.

The example corrective action library (150) may include any number of entries (152, 154). Each of the entries may include a fault profile (152.2) and corrective actions (152.4) associated with the fault profile (152.2). Each of the entries may be generated based on an associative model.

If a fault profile is received from a client, the fault profile may be matched to a fault profile specified by any of the entries of the example corrective action library (150) to identify corrective actions for remediating a component fault associated with the fault profile.

In one or more embodiments of the invention, a fault profile (e.g., 152.2) is a multidimensional data structure that includes portions of component logs from client having a faulty component. For additional details regarding fault profiles, refer to FIG. 1.5.

In one or more embodiments of the invention, the corrective actions (152.4) specify any number of actions, e.g., one corrective action, two, corrective actions, N corrective actions, etc. The corrective actions may be instructions for actions to be performed to correct a component fault. The corrective actions (152.4) may include changes to components of the client and/or changes to other portions of a solution architecture. Each of the corrective actions may be associated with fault correction scripts, other types of executable data structures, and/or other descriptive data structures.

Each of the entries (152, 154) may be uniquely associated with a corresponding fault profile. For example, entry A (152) may be associated with a first fault profile and entry N (154) may be associated with a second fault profile that is different from the first fault profile (by including different fault profiles).

Some of the entries (152, 154) may not be uniquely associated with a corresponding fault profiles. For example, entry A (152) may be associated with a first fault profile and entry N (154) may also be associated with the first fault profile (by including the same fault profile). In such a scenario, the corrective actions of all entries having the same fault profile as a fault profile received from a client may be used to remediate the client.

FIG. 1.5 shows a diagram of an example fault profile (160) in accordance with one or more embodiments of the invention. The example fault profile (160) may be a data structure that includes information regarding the states of any number of components of a client having a faulty component.

The example fault profile (160) may include hardware components characteristics (160.2). The hardware components characteristics (160.2) may include information regarding the state of hardware components of a client that are associated with a faulty component by a dependency. For example, the state of any hardware components upon which operation of the faulty component depends may be included in the hardware components characteristics (160.2). The state information may be obtained from logs of the hardware components. The state information may include may include operational parameters, any errors, and/or any warning included in the hardware component logs.

The example fault profile (160) may also include software component characteristics (160.4) that include information similar to that of the hardware component characteristics (160.2) but for software components of the client having a faulty component.

The example fault profile (160) may additionally include settings (160.6) that include settings information regarding the hardware and/or software components of the client.

As discussed above, embodiments of the invention may facilitate recovery of clients after a fault. FIGS. 2.1-2.2 show methods in accordance with one or more embodiments of the invention that may be performed by components of the system of FIG. 1.1. While illustrated as a series of steps, any of the steps shown in FIGS. 2.1-2.2 may be omitted, performed in a different order, and/or performed in a parallel or partially overlapping manner. Further, additional steps, other than those shown in FIGS. 2.1-2.2 may be performed as part of the methods discussed below without departing from the invention.

FIG. 2.1 shows a flowchart of a method in accordance with one or more embodiments of the invention. The method depicted in FIG. 2.2 may be used to correct client component faults in accordance with one or more embodiments of the invention. The method shown in FIG. 2.1 may be performed by, for example, clients (e.g., 100, FIG. 1.1). Other components of the system illustrated in FIG. 1.1 may perform the method of FIG. 2.1 without departing from the invention.

In step 200, a fault of the component of the client is identified.

In one or more embodiments of the invention, the component of the client is a hardware component such as, for example, processor, memory, or storage. Hardware component may be a different type of component without departing from the invention.

In one or more embodiments of the invention, the component of the client is a software component executing using computing resources of the client.

In one or more embodiments of the invention, the fault is a failure of the component. The failure may cause the component to be unable to perform its intended function.

In one or more embodiments of the invention, the fault is a degradation in performance of the component. The degradation of the component may reduce the ability of the component to perform its intended function.

In one or more embodiments of the invention, the fault is a change in state of the component.

In one or more embodiments of the invention, the fault is identified by monitoring the component. For example, an increase in temperature of the processor may be fault. Monitoring the processor temperature may indicate the occurrence of the fault.

In step 202, logs of components of the client are collected.

In one or more embodiments of the invention, the logs are collected for a period of time associated with the fault. For example, the logs may include state information over time including the period of time associated with the fault.

In one or more embodiments of the invention, the logs include logs of hardware components. One or more embodiments of the invention, the logs include logs of software components. The logs of the hardware components and the logs of the software components may be generated by an operating system of the client, the components themselves, and/or other entities.

In one or more embodiments of the invention, logs are collected by storing the logs in a predetermined location. The predetermined location may be a repository for storing information relevant to component faults.

In one or more embodiments of the invention, the logs of the components specify characteristics of the components over time. Characteristics of the components may include, for example, state information, errors, and warnings. The errors and/or warnings may represent deviations by each respective component from predetermined operational characteristics. The predetermined operational characteristics may be specified by a provider the respective components.

In step 204, a fault profile for the fault is generated based on the logs and/or component dependencies of the client.

In one or more embodiments of the invention, the fault profile is generated by filtering the logs based on component dependencies of the clients. The component dependencies may specify relationships between components of the client. Logs for all components that are related to the component that generated the fault may be collected as the filtered logs.

In one or more embodiments of the invention, the fault profile is generated by aggregating the filtered logs. By aggregating the filtered logs, a multidimensional fault profile may be generated. For example, the fault profile may include information regarding any number of components. Information regarding each of the any number of components may be considered a separate dimension of the fault profile.

In step 206, a fault correction script is obtained based on the fault profile.

In one or more embodiments of the invention, the fault correction script is obtained by matching the fault profile to corrective actions. Each of the corrective actions may be associated with a fault correction script. Any number of the matched fault correction scripts may be aggregated to form the obtained fault correction script.

In one or more embodiments of the invention, the fault correction script is obtained by sending the fault profile to a fault correction orchestrator. The fault correction orchestrator may send the fault correction script in response to receiving the fault profile.

In step 208, the fault correction script is executed.

In one or more embodiments of the invention, the fault correction script is executed by performing the actions specified by the corrective actions. Executing the fault correction script may attempt to correct the fault. However, the attempt to correct the fault may not be successful.

In one or more embodiments of the invention, the fault correction script is executed by orchestrating execution of the fault correction script. Orchestrating execution of the fault correction script may be performed by sending all, or a portion, of the fault correction script to other entities. The other entities may be clients or other components of a solution architecture. The other entities may then execute the portions of the fault correction script.

In step 210, a determination is made regarding whether execution of the script corrected the fault.

If the fault was corrected, the method may proceed to step 214. If the fault was not corrected, the method may proceed to step 212.

In step 212, the fault is logged is not been corrected by the fault correction script.

In one or more embodiments of the invention, the fault is logged as not having been corrected by the fault correction script by sending a notification to a fault correction orchestrator of the failure.

The method may proceed to Step 202 following step 212. By returning to step 202 following step 212, the processes of attempting to remediate the fault may be repeated.

Returning to step 210, the method may proceed to step 214 following step 210.

In step 214, the fault is logged has been corrected by the fault correction script.

In one or more embodiments of the invention, the fault is logged as having been corrected by the fault correction script by sending a notification to the fault correction orchestrator of the successful remediation of the fault.

The method may end following Step 214.

By logging the outcome of the attempt at correcting the fault, an associative model may be updated. Consequently, in the event of a failure, different fault corrective scripts may be executed each time an attempt to correct the fault is made.

FIG. 2.2 shows a flowchart of a method in accordance with one or more embodiments of the invention. The method depicted in FIG. 2.2 may be used to correct client component faults in accordance with one or more embodiments of the invention. The method shown in FIG. 2.2 may be performed by, for example, fault correction orchestrator (e.g., 110, FIG. 1.1). Other components of the system illustrated in FIG. 1.1 may perform the method of FIG. 2.2 without departing from the invention.

In step 220, a fault profile associated with the client is obtained.

In one or more embodiments of the invention, the fault profile may be obtained from the client. For example, the client may send the fault profile to the fault correction orchestrator via an operable connection.

In step 222, the fault profile is matched to corrective action based on an associative model.

In one or more embodiments of the invention, the fault profile is matched to the corrective action based on the dimensions of the fault profile. As noted above, a fault profile may include any number of dimensions based upon the dependencies of the faulty component. Thus, one or more entries of a corrective action library may be matched to the fault profile. Each entry may include one or more corrective actions.

In step 224, correction action script is obtained based on the corrective action.

In one or more embodiments of the invention, the fault correction script is obtained from a fault correction script repository. Any number of fault correction scripts included in the fault correction script repository may be aggregated to form the obtained correction action script.

In one or more embodiments of the invention, the corrective action is associated with the corrective action script.

In step 226, execution of the fault correction script is orchestrated.

In one or more embodiments of the invention, execution of the fault correction script is orchestrated by sending the script to a client associated with the fault profile. The client may execute the fault correction script.

In one or more embodiments of the invention, execution of the fault correction script is orchestrated by sending the script to a component of a solution architecture other than the client. The client may be a portion of the solution architecture. The component of the solution architecture that is not the client may execute the script.

In one or more embodiments of the invention, execution of the fault correction script is orchestrated by sending a notification to an administrator or other personnel. The notification may specify actions to be performed on the client associated with the fault profile or another entity that cannot be performed via computer implemented methods.

In step 228, an associative model is updated based on the correction action script execution.

In one or more embodiments of the invention, the associative model is updated by retraining the associative model based on the outcome of orchestrating execution of the correction action script. Retraining the associative algorithm, a corrective action library may be updated to more accurately associate corrective actions with fault profiles.

In step 230, a determination is made regarding whether execution of the script corrected the fault. If execution of the script corrected the fault, the method may end following step 230. If execution of the script did not correct the fault, the method may proceed to step 222.

Returning to step 222, additional attempts to correct the fault may be made using an updated associative model. Consequently, subsequent attempts to correct the fault may include the use of different corrective action scripts.

To further clarify aspects of embodiments of the invention, a non-limiting example is provided in FIGS. 3.1-3.6. In FIGS. 3.1-3.6, a system similar to the system of FIG. 1.1 is providing fault correction services to clients. For the sake of brevity, only a limited number of components of the system of FIG. 1.1 are shown in FIGS. 3.1-3.6.

Example

Consider a scenario as illustrated in FIG. 3.1 in which a client (300) is providing computer implemented services to other entities while in a fault state. To provide such services, the client (300) includes a processor (302), a faulty memory (304), and a persistent storage in a temperature warning state (320). The computer implemented services include database services supported by a database application (310) and a database (322). The computer implemented services also include email services supported by an email application in a fault state (312) and email repository (324).

Due to the fault state of the email application, the client (300) obtains logs associated with the components of the client (300) and generates a first fault profile (360) as shown in FIG. 3.2. The first fault profile (360) specifies that the email application is in a failure state and that the persistent storage is in a temperature warning state. Such information was included in the first fault profile (360) because the email application is dependent upon the persistent storage for storing of the email repository (324).

After generating the first fault profile (360), the client (300) sends the first fault profile (360) to a fault correction orchestrator (not shown). In response to receiving the first fault profile (360) fault correction orchestrator matches the first fault profile (360) to entry a (352) of a corrective action library (350) as shown in FIG. 3.3.

The corrective action library (350) includes two entries, entry A (352) and entry B (354). Entry A (352) includes fault profile A (352.2) that better matches the first fault profile then fault profile B (354.2) of entry B (354.2). Consequently, entry A (350) was matched and corrective action A (352.4), rather than corrective action B (354.4), will be used for fault remediation purposes.

After matching to entry A (352), the fault correction orchestrator generate a corrective action script based on corrective action A (352.4) to increase the fan speed of the client. Once generated, the fault correction orchestrator sends the corrective action script to the client.

The client executes the corrective action script which lowers the temperature of the persistent storage resulting in the persistent storage been in the temperature normal state (362) as illustrated in FIG. 3.4. However, executing the corrective action script did not correct the faulty memory (304) or the email application in a fault state (312).

Because the fault has not been corrected, the client (300) generates a second fault profile (362) as shown in FIG. 3.5. The second fault profile (362) only specifies that the email application is in a fault state. After generating the second fault profile (362), the client sends the second fault profile (362) to the fault correction orchestrator.

In response to receiving the second fault profile (362), fault correction orchestrator matches the second fault profile (362) to entry be (354) of the corrective action library (350) shown in FIG. 3.3. Based on the match, the fault correction orchestrator generates a second script that attempts to remediate memory as specified by corrective action B (354.4).

Once generated, the fault correction orchestrator sends the second script to the client. Upon receipt, the client executes the second fault correction script which corrects the memory of the client and places the email application and operational state resulting in corrected memory (306) and an email application in operational state (314) as shown in FIG. 3.6.

End of Example

While the above example has been described with respect to a completely automated remediation, embodiments of the invention may include assignment of a remediation task to a person and confirmation of the remediation being obtained after the assigned person completes the remediation task. For example, if a memory has failed, a person may be assigned a remediation task of physically removing the memory and installing a new memory.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device. The communication interface (412) may include a network adapter or other hardware element that supports communications via any type of networking technology/standard.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may improve the field of distributed computing devices. Specifically, embodiments of the invention may provide an improved method for recovering from faults of computing devices. Embodiments of the invention may aggregate fault information from any number of computing devices and perform corrective action based on the aggregated fault information. By doing so, the accuracy of the corrective action for fault correction purposes may be improved when compared to contemporary methods for fault correction.

Embodiments of the invention may further improve the field of distributed computing devices by identifying potential solutions to faults of computing devices based on a multidimensional fault profile. Rather than focusing on well-known vectors for computing device faults, embodiments of the invention may utilize rich reporting information obtained from numerous types of logs of components of computing devices. By doing so, unknown vectors for computing device faults may be identified.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of a configurable device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A client recovery orchestrator for recovering clients after faults, comprising:
    a persistent storage for storing a fault correction script; and
    a recovery manager programmed to:
        obtain logs associated with components of a client of the clients, generating a fault profile for a fault of the faults using the logs, wherein the fault profile is based on component dependencies of the client, wherein the component dependencies specify:
    a hardware component associated with a second hardware component that generated the fault, and
    a software component associated with the second hardware component that generated the fault,
match the fault profile to a corrective action based on an associative model that associates dimensions of the fault profile and the corrective action,
obtain the fault correction script based on the corrective action,
orchestrate execution of the fault correction script to obtain an updated client, and
update the associative model based on the updated client.

2. The client recovery orchestrator of claim 1, wherein the recovery manager is further programmed to:
make a determination that the fault is still present in the client after orchestrating execution of the fault correction script;
in response to the determination:
    obtain a second fault profile associated with the client.

3. The client recovery orchestrator of claim 1, wherein the hardware component is part of the client.

4. The client recovery orchestrator of claim 1, wherein the hardware component is not part of the client.

5. The client recovery orchestrator of claim 1, wherein the hardware component is a portion of a solution architecture of which the client is a portion.

6. A method for recovering clients after faults, comprising:
obtaining logs associated with components of a client of the clients:
generating a fault profile for a fault of the faults using the logs, wherein the fault profile is based on component dependencies of the client, wherein the component dependencies specify:
    a hardware component associated with a second hardware component that generated the fault, and
    a software component associated with the second hardware component that generated the fault;
matching the fault profile to a corrective action based on an associative model that associates dimensions of the fault profile and the corrective action;
obtaining a fault correction script based on the corrective action;
executing the fault correction script to obtain an updated client; and
updating the associative model based on the updated client.

7. The method of claim 6, further comprising:
making a determination that the fault is still present in the client after orchestrating execution of the fault correction script;
in response to the determination:
    obtaining a second fault profile associated with the client.

8. The method of claim 6, wherein the hardware component is part of the client.

9. The method of claim 6, wherein the hardware component is not part of the client.

10. The method of claim 6, wherein the hardware component is a portion of a solution architecture of which the client is a portion.

11. A non-transitory computer readable medium comprising computer readable program code, which when executed by a computer processor enables the computer processor to perform a method for recovering clients after faults, comprising:
obtaining logs associated with components of a client of the clients;
generating a fault profile for a fault of the faults using the logs, wherein the fault profile is based on component dependencies of the client, wherein the component dependencies specify:
    a hardware component associated with a second hardware component that generated the fault, and
    a software component associated with the second hardware component that generated the fault;
matching the fault profile to a corrective action based on an associative model that associates dimensions of the fault profile and the corrective action;
obtaining a fault correction script based on the corrective action;
executing the fault correction script to obtain an updated client; and
updating the associative model based on the updated client.

12. The non-transitory computer readable medium of claim 11, wherein the method further comprises:
making a determination that the fault is still present in the client after orchestrating execution of the fault correction script;
in response to the determination:
    obtaining a second fault profile associated with the client.

13. The non-transitory computer readable medium of claim 11, wherein the hardware component is part of the client.

14. The non-transitory computer readable medium of claim 11, wherein the hardware component is not part of the client.

15. The client recovery orchestrator of claim 1, wherein the fault prevents the client from providing a computer implemented service.

16. The client recovery orchestrator of claim 1, wherein the associative model relates fault profiles to corrective actions.

17. The method of claim 6, wherein the fault prevents the client from providing a computer implemented service.

18. The method of claim 6, wherein the associative model relates fault profiles to corrective actions.

19. The non-transitory computer readable medium of claim 11, wherein the fault prevents the client from providing a computer implemented service.

20. The non-transitory computer readable medium of claim 11, wherein the associative model relates fault profiles to corrective actions.

* * * * *

UNITED STATES PATENT AND TRADEMARK OFFICE
CERTIFICATE OF CORRECTION

| | | |
|---|---|---|
| PATENT NO. | : 10,977,113 B2 | Page 1 of 1 |
| APPLICATION NO. | : 16/261204 | |
| DATED | : April 13, 2021 | |
| INVENTOR(S) | : Rizwan Ali, Dharmesh M. Patel and Ravikanth Chaganti | |

It is certified that error appears in the above-identified patent and that said Letters Patent is hereby corrected as shown below:

In the Claims

Column 17, Line 1, in Claim 1, the phrase "generating a fault profile" should read -- generate a fault profile --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*